E. M. BISHOP.
LOCK FOR VEHICLES.
APPLICATION FILED JULY 10, 1912.
1,042,875.
Patented Oct. 29, 1912.
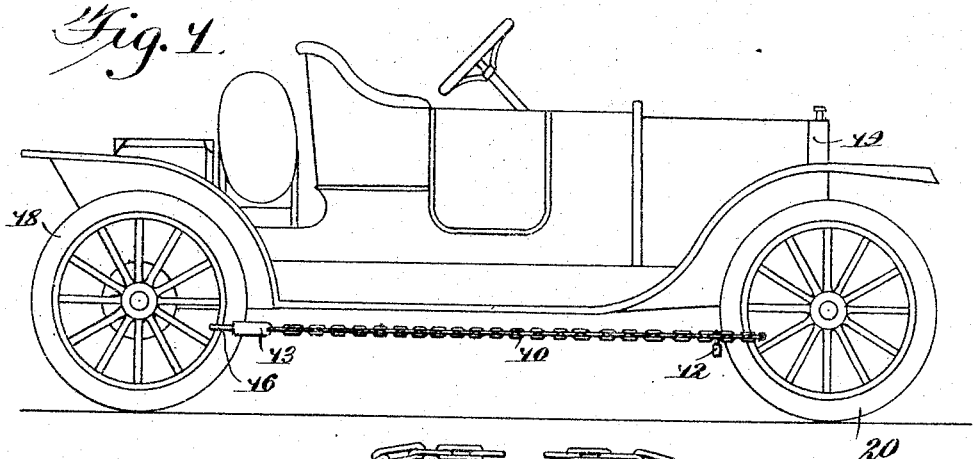
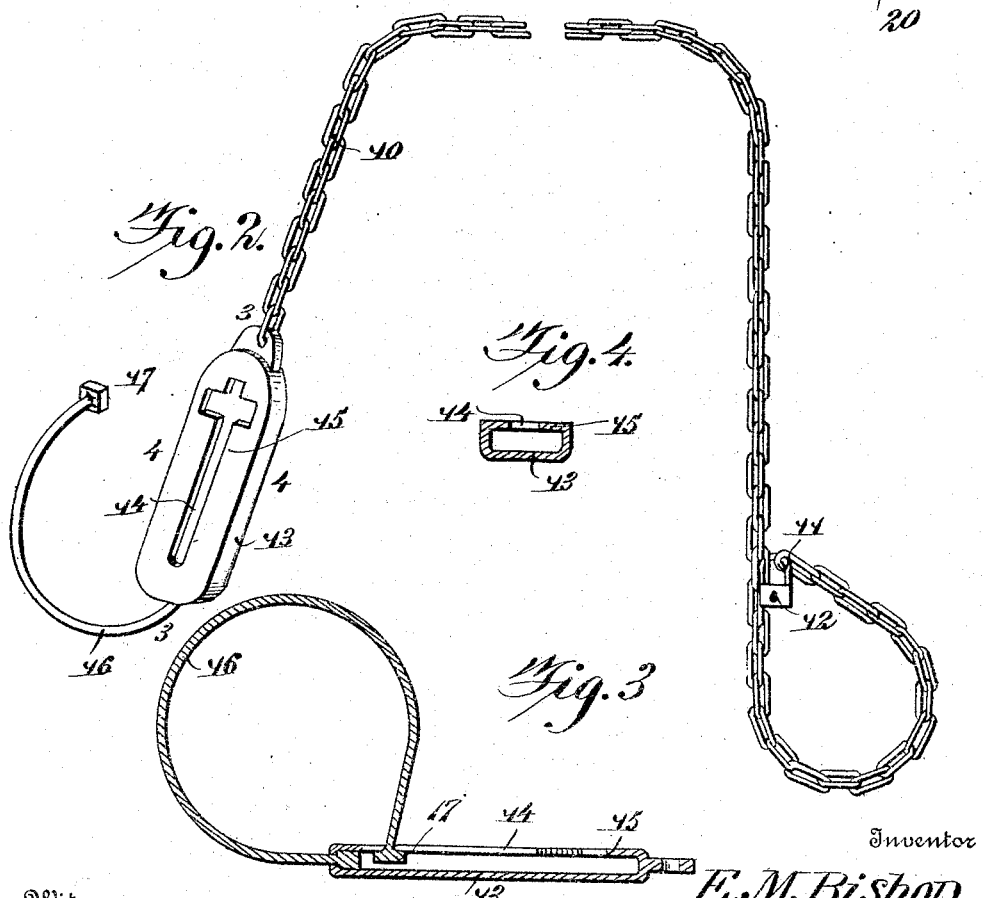
Witnesses
W. S. McDowell
Inventor
E. M. Bishop
By Victor J. Evans
Attorney

UNITED STATES PATENT OFFICE.

EPHRAIM M. BISHOP, OF KINGSTON, NEW YORK.

LOCK FOR VEHICLES.

1,042,875. Specification of Letters Patent. Patented Oct. 29, 1912.

Application filed July 10, 1912. Serial No. 708,633.

*To all whom it may concern:*

Be it known that I, EPHRAIM M. BISHOP, a citizen of the United States, residing at Kingston, in the county of Ulster and State of New York, have invented new and useful Improvements in Locks for Vehicles, of which the following is a specification.

An object of the invention is to provide a device for locking the running gear of a vehicle so that the same cannot be readily stolen or carried away.

My invention is particularly adapted for use in connection with automobiles and other vehicles and comprehends a device for connection with the front and rear wheels of the vehicle whereby the vehicle will be prevented from being operated over the ground.

The invention further embodies a device that is simple in construction and which can be readily attached to the vehicle to produce the desired result.

In the further disclosure of the invention reference is to be had to the accompanying drawings constituting a part of this specification, in which similar characters of reference denote corresponding parts in all the views, and in which:

Figure 1 is a fragmentary side elevation of an automobile showing my device applied thereto; Fig. 2 is a perspective view of the device; Fig. 3 is a vertical sectional view of the casing and securing member; and Fig. 4 is a transverse sectional view of the casing.

Referring more particularly to the views, use is made of a chain 10 having an enlarged link 11 at one end thereof, said link being adapted to receive a suitable padlock 12 having connection with one of the other links of the chain 10 as shown in Figs. 1 and 2. The other end of the chain 10 has connection with a casing 13 provided with a cross slot 14 in the upper face 15 thereof, a spring-like securing member 16 having an end thereof rigidly secured to an end of the casing 13 and provided with a locking head 17 on the free end thereof.

In the use of the device, the spring-like member 16 is arranged to pass around one of the rear wheels 18 of a vehicle 19, the locking head 17 being then passed through the crossed portion of the slot 14 so that the spring-like member 16 adjacent the head 17 will slide in the elongated portion of the slot. The free end of the chain 10 is then arranged to pass around one of the front wheels 20 of the vehicle 19 and the padlock 12 is then connected to the link 11 and one of the links of the chain, thus connecting the rear and front wheels 18 and 20 by the chain 10, it being readily seen that the chain will be sufficiently taut to prevent the head 17 of the spring-like member 16 from being removed from the casing 13, the elongated portion of the slot 14 being of smaller width than the head 17 so that it is necessary to first slide the head to the crossed portion of the slot before the same can be removed from the casing 13. It will thus be seen that in view of the tautness of the chain the locking head will be retained in the casing 13 and can only be removed therefrom when the padlock 12 has been unlocked and the chain 10 removed from the front wheel 20 of the vehicle 19. The spring-like member 16 is preferably made of a high grade of steel bent so that the spring-like action of the member will normally tend to cause the member to coil up so that at the moment the locking head 17 is passed through the crossed portion of the slot 14 the spring-like action of the member 16 will cause the head 17 to slide in the casing toward that end of the casing to which the spring-like member 16 is rigidly secured.

As mentioned heretofore, my device can be cheaply manufactured and can be quickly applied to or detached from the vehicle, it being seen by referring to Fig. 1 that when the device is in applied position, the vehicle cannot be readily advanced along the ground.

Having thus described my invention, I claim:

As a new article of manufacture, a casing provided with a slot, a spring-like member having rigid connection with the casing, a locking head on the free end of the spring-like member and adapted to be inserted through the slot therein, the said spring-like member being adapted to encircle the wheel of a vehicle, and a chain having connection with the casing and adapted for connection with another wheel of the said vehicle.

In testimony whereof I affix my signature in presence of two witnesses.

EPHRAIM M. BISHOP.

Witnesses:
CHARLES W. WALTON,
ELSIE A. BOYCE.